United States Patent
McCord et al.

(10) Patent No.: US 9,347,824 B2
(45) Date of Patent: May 24, 2016

(54) LIGHT COLLECTION OPTICS FOR MEASURING FLUX AND SPECTRUM FROM LIGHT-EMITTING DEVICES

(71) Applicant: KLA-Tencor Corporation, Milpitas, CA (US)

(72) Inventors: Mark A. McCord, Los Gatos, CA (US); Joseph A. DiRegolo, Livermore, CA (US); Michael R. Gluszczak, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 14/527,034

(22) Filed: Oct. 29, 2014

(65) Prior Publication Data

US 2015/0124253 A1 May 7, 2015

Related U.S. Application Data

(60) Provisional application No. 61/899,088, filed on Nov. 1, 2013.

(51) Int. Cl.
*G01J 1/04* (2006.01)
*G01J 3/28* (2006.01)
*G01J 3/02* (2006.01)
*G01J 3/50* (2006.01)
*G01J 1/02* (2006.01)
*G01J 1/42* (2006.01)

(52) U.S. Cl.
CPC ............. *G01J 1/0407* (2013.01); *G01J 1/0214* (2013.01); *G01J 3/0251* (2013.01); *G01J 3/0262* (2013.01); *G01J 3/28* (2013.01); *G01J 3/505* (2013.01); *G01J 2001/0481* (2013.01); *G01J 2001/4252* (2013.01)

(58) Field of Classification Search
CPC ....... G01N 21/64; G01N 21/21; G01N 21/55; G01N 2201/062; G01N 21/255; G01N 21/274; G01N 21/33; G01N 21/359; G01N 21/474; G01N 21/49; G01N 21/59; G01N 21/66; G01N 2201/061; G01N 2201/065
See application file for complete search history.

(56) References Cited

U.S. PATENT DOCUMENTS

| | | | |
|---|---|---|---|
| 6,721,048 B2 | 4/2004 | Yokota et al. | |
| 6,734,959 B2 | 5/2004 | Griffiths et al. | |
| 2003/0038938 A1 | 2/2003 | Jung et al. | |
| 2006/0139580 A1 | 6/2006 | Conner | |
| 2006/0170923 A1 | 8/2006 | Schmitt | |
| 2006/0226848 A1 | 10/2006 | Lai et al. | |
| 2008/0204884 A1 | 8/2008 | Jang | |
| 2009/0236506 A1* | 9/2009 | Dudgeon | G01J 1/42 250/228 |
| 2011/0025337 A1 | 2/2011 | Morrow et al. | |
| 2011/0195531 A1* | 8/2011 | Sohn | G01J 1/04 438/16 |
| 2011/0316579 A1 | 12/2011 | Ryu | |

(Continued)

*Primary Examiner* — Michael P Stafira
(74) *Attorney, Agent, or Firm* — Suiter Swantz pc llo (57) ABSTRACT

Systems and methods for accurately measuring the luminous flux and color (spectra) from light-emitting devices are disclosed. An integrating sphere may be utilized to directly receive a first portion of light emitted by a light-emitting device through an opening defined on the integrating sphere. A light collector may be utilized to collect a second portion of light emitted by the light-emitting device and direct the second portion of light into the integrating sphere through the opening defined on the integrating sphere. A spectrometer may be utilized to measure at least one property of the first portion and the second portion of light received by the integrating sphere.

17 Claims, 5 Drawing Sheets

(56) References Cited

U.S. PATENT DOCUMENTS

| | | | | |
|---|---|---|---|---|
| 2013/0119275 A1* | 5/2013 | Solarz | | G01R 31/44 250/459.1 |
| 2014/0078496 A1* | 3/2014 | Cheng | | G01J 1/0204 356/236 |
| 2014/0084188 A1* | 3/2014 | Huang | | G01R 31/2635 250/552 |
| 2014/0268152 A1* | 9/2014 | Morrow | | G01N 21/66 356/402 |
| 2015/0198480 A1* | 7/2015 | Mak | | G01J 1/42 356/237.1 |

* cited by examiner

LIGHT COLLECTION OPTICS FOR MEASURING FLUX AND SPECTRUM FROM LIGHT-EMITTING DEVICES

CROSS-REFERENCE TO RELATED APPLICATIONS

The present application claims the benefit under 35 U.S.C. §119(e) of U.S. Provisional Application Ser. No. 61/899,088, filed Nov. 1, 2013. Said U.S. Provisional Application Ser. No. 61/899,088 is hereby incorporated by reference in its entirety.

GOVERNMENT LICENSE RIGHTS

This invention was made with government support under Government Contract No. DE-EE0005877 awarded by the U.S. Department of Energy. The government has certain rights in the invention.

TECHNICAL FIELD

The disclosure generally relates to the field of light-emitting devices, and particularly to systems and methods for testing of light-emitting devices.

BACKGROUND

A light-emitting diode (LED) is a semiconductor light source. Testing of LEDs, particularly white high-brightness LEDs used for illumination, is generally performed utilizing an integrating sphere and a photospectrometer coupled to the integrating sphere. An integrating sphere typically includes a hollow spherical cavity with its interior covered with a diffuse reflective coating.

SUMMARY

The present disclosure is directed to an apparatus. The apparatus may include an integrating sphere for directly receiving a first portion of light emitted by a light source through an opening defined on the integrating sphere. The apparatus may also include a light collector for collecting a second portion of light emitted by the light source and directing the second portion of light into the integrating sphere through the opening defined on the integrating sphere. The apparatus may further include a spectrometer for measuring at least one property of the first portion and the second portion of light received by the integrating sphere.

A further embodiment of the present disclosure is directed to a system for in-line testing of a plurality of light sources positioned on a support structure. The system may include an integrating sphere for directly receiving a first portion of light emitted by at least one light source of the plurality of light sources through an opening defined on the integrating sphere. The system may also include a light collector for collecting a second portion of light emitted by the at least one light source of the plurality of light sources and directing the second portion of light into the integrating sphere through the opening defined on the integrating sphere. The system may further include a spectrometer for measuring at least one property of the first portion and the second portion of light received by the integrating sphere.

An additional embodiment of the present disclosure is directed to a method for in-line testing of a plurality of light sources positioned on a support structure. The method includes: positioning an integrating sphere to directly receive a first portion of light emitted by at least one light source of the plurality of light sources through an opening defined on the integrating sphere; positioning a light collector to collect a second portion of light emitted by the at least one light source of the plurality of light sources and to direct the second portion of light into the integrating sphere through the opening defined on the integrating sphere; and measuring at least one property of the first portion and the second portion of light received by the integrating sphere utilizing a spectrometer.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
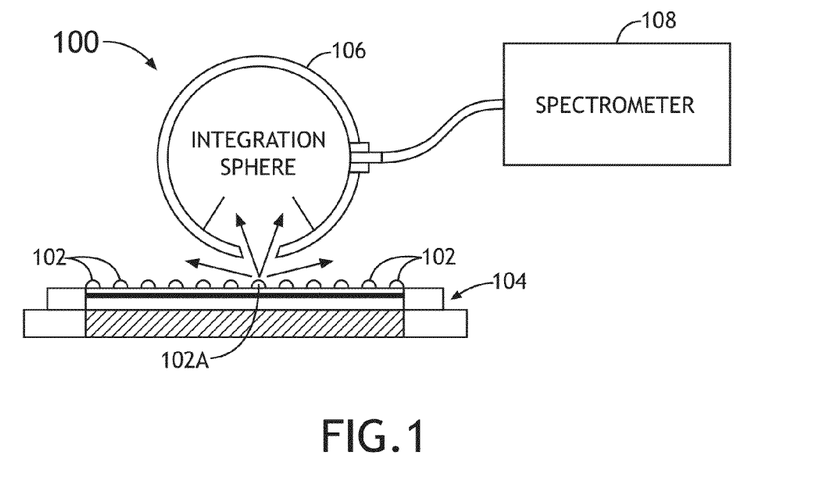
FIG. 1 is a cross-sectional illustration depicting an in-line testing system for LEDs.

Referring to FIG. 1, an illustration depicting an in-line testing system 100 for LEDs is shown. As depicted in FIG. 1, LEDs 102 (i.e., devices under test) may be partially packaged or otherwise positioned on a ceramic or tile substrate 104, which may hold a few hundred devices 102 spaced a few millimeters apart. An integrating sphere 106 may be utilized to collect and homogenize light emitted by a particular LED 102A under test and send the collected and homogenized light to a spectrometer 108 for measurement of one or more properties of light collected by the integrating sphere 106.

It is noted that due to the presence of adjacent LEDs 102 located on the substrate 104, the integrating sphere 106 may not be able to fit close enough to the surface of the substrate 104 to collect all the light emitted by the particular LED 102A under test. The inability to collect all the light emitted by the particular LED 102A under test introduces some uncertainties in the measurement. In addition, color (spectra) may also be affected because the light that escapes at oblique angles tends to have a slightly different color than the normal light that is collected. Furthermore, some light may scatter off adjacent devices positioned on the substrate 104, which may also negatively affect the accuracy of the measurement.

Embodiments in accordance with the present disclosure are directed to systems and methods for accurately measuring the luminous flux and color (spectra) from the LEDs without the aforementioned shortcomings.

Figure 2:
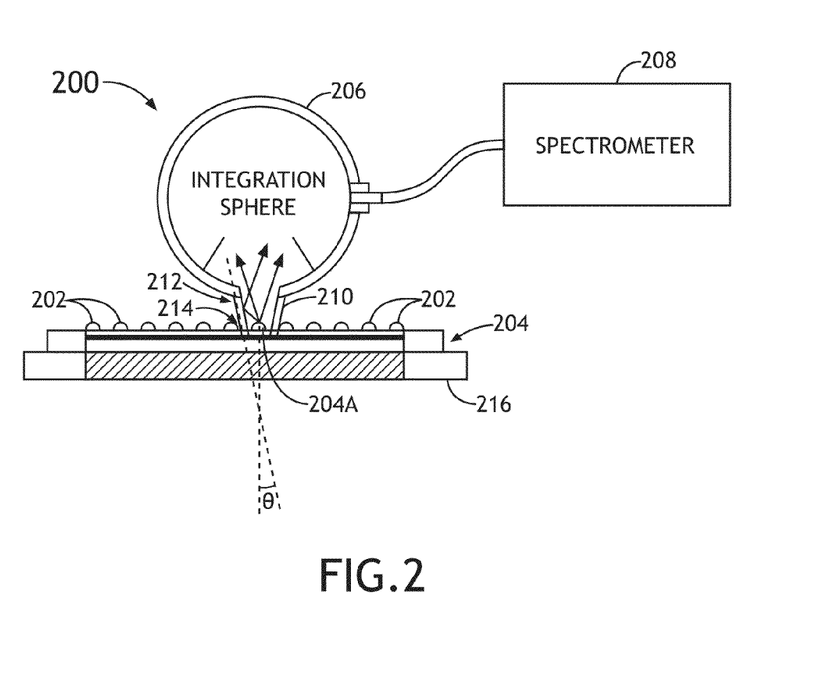
FIG. 2 is a cross-sectional illustration depicting an in-line testing system for LEDs that utilizes a light collector for improved measurement accuracy.

Referring now to FIG. 2, an illustration depicting an in-line testing system 200 for LEDs in accordance with an embodiment of the present disclosure is shown. Similar to the illustration depicted in FIG. 1, LEDs 202 (i.e., devices under test) may also be partially packaged on a substrate 204, which may hold a number of LEDs 202 spaced a certain distance (e.g., a few millimeters) apart from each other. The substrate 204 may be supported by a support device 216 during the testing process.

As depicted in FIG. 2, a light collector 210 with a specular reflecting inner surface is positioned between the integrating sphere 206 and the substrate 204. The light collector 210 is configured to collect oblique light that would otherwise escape and not enter the integrating sphere 206. The light collector 210 is also configured in a manner so that it does not interfere or diminish the light that may directly enter the integrating sphere 206.

In one embodiment, the light collector 210 may be configured to have a generally cylindrical or truncated conical shape defining openings on both ends 212 and 214 of the light collector 210. One end 212 of the light collector 210 may extend toward a corresponding opening (e.g., entrance aperture) defined on the integrating sphere 206 and another end 214 of the light collector 210 may extend toward the surface of the substrate 204.

It is contemplated that the size of the opening defined on the end 214 of the light collector 210 may be configured such that the light collector 210 fits between adjacent LEDs 202 positioned on the substrate 204. In this manner, the light collector 210 is able to surround a given LED 204A and collect substantially all the light emitted by that given LED 204A. The ability to collect substantially all the light emitted by a given LED under test effectively minimizes light losses and improves measurement accuracies of the spectrometer 208.

It is also contemplated that the light collector 210 may be optimized to maximize its effectiveness. For instance, by optimizing the angle of the specular reflecting inner surface of the light collector 210, light collected by the light collector 210 may be directed into the integrating sphere 206 with only a single reflection, thus minimizing absorption losses and potential color shift. In one embodiment, the light collector 210 is configured to have a truncated conical shape with a tapered opening defined on the end 214 toward the surface of the substrate 204. For example, a cone angle $\theta$ of 24 degrees is ideal for providing optimal reflection for a particular in-line testing system. However, it is contemplated that the specific cone angle $\theta$ may be determined based on a variety of factors, including, but not limited to, the size of the LEDs 202 being tested, the spacing between adjacent LEDs 202, the size of the opening defined on the integrating sphere 206, the distance between the integrating sphere 206 and the substrate 204, and the like.

It is further contemplated that the light collector 210 may be mechanically movable up and down separately from the integrating sphere 206 to facilitate high speed testing operations. More specifically, referring to FIGS. 3 through 5, the in-line testing system 200 may be utilized to test another LED 202B after LED 202A has been tested, which means the LED 202B may be repositioned so that it is under the integrating sphere 206 and the light collector 210, or alternatively, the integrating sphere 206 and the light collector 210 may be repositioned to collect the light emitted by LED 202B. Providing a light collector 210 that is able to mechanically retract (e.g., utilizing voice coil, pneumatic piston, or various other types of mechanical drives) provides the necessary clearance and allows the repositioning process to be carried out without hitting any LED domes 202. Once the repositioning process is completed, the light collector 210 may be mechanically extended down toward the substrate 204 again to facilitate testing of the next LED (e.g., LED 202B).

Figure 3:
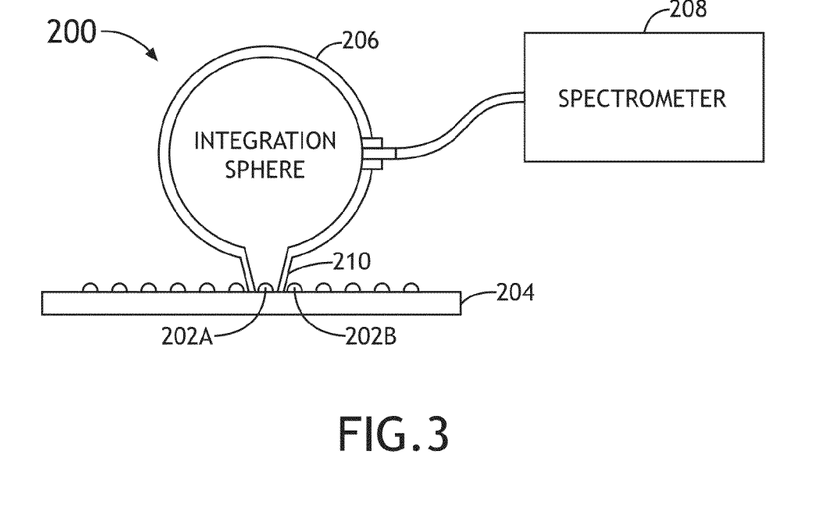
FIG. 3 is a cross-sectional illustration depicting an in-line testing system for LEDs with a light collector extended for collecting light emitted from a particular LED.
Figure 4:
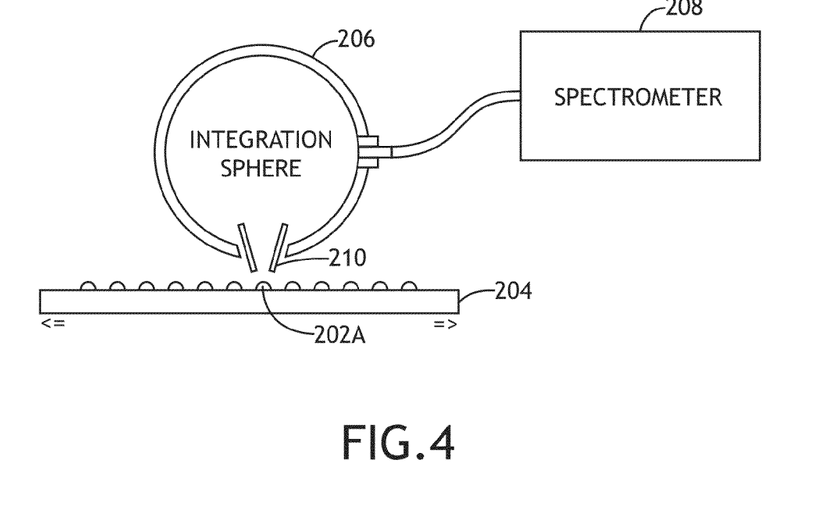
FIG. 4 is a cross-sectional illustration depicting the in-line testing system of FIG. 3 with the light collector retracted to facilitate repositioning of the integrating sphere.
Figure 5:
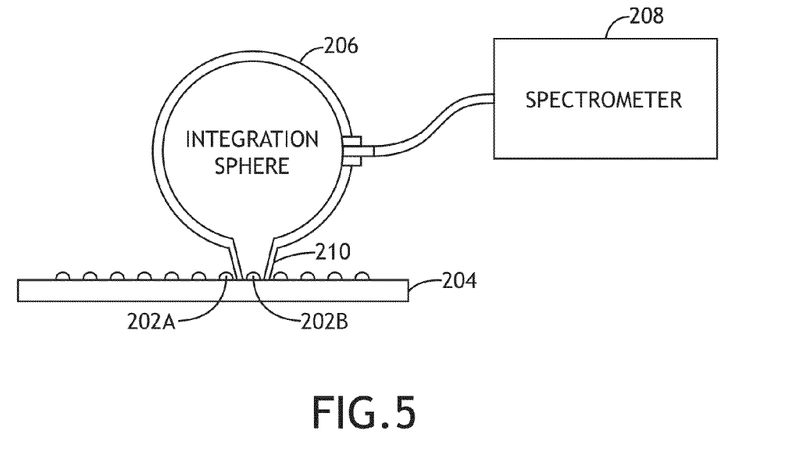
FIG. 5 is a cross-sectional illustration depicting the in-line testing system of FIG. 3 with the light collector extended after repositioning for collecting light emitted from another LED.

It is to be understood, however, that the light collector 210 is not required to be mechanically retractable to avoid hitting the LED domes 202. Alternatively (or additionally), the light collector 210 may remain stationary relative to the integrating sphere 206 as a joint unit, and the relative position between the joint unit (including both the light collector 210 and the integrating sphere 206 together) and the substrate 204 may be adjusted to provide the necessary clearance during the reposition process. It is contemplated that the relative position between the joint unit (210 and 206) and the substrate 204 may be adjusted by either repositioning the substrate 204 or repositioning the joint unit without departing from the spirit and scope of the present disclosure.

Figure 6:
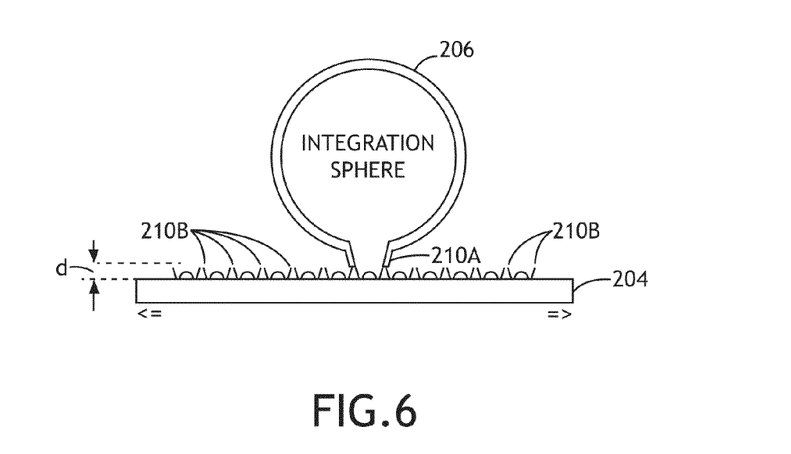
FIG. 6 is a cross-sectional illustration depicting repositioning of another in-line testing system that utilizes a light collector for improved measurement accuracy.

In another implementation, as depicted in FIG. 6, the light collector 210 may be split into a first portion 210A that is fixedly attached to the integrating sphere 206 and a second portion 210B that is fixedly attached to the substrate 204. The second portion 210B may include a plurality of substantially identical truncated cones positioned according to the positions of the LEDs 202. It is contemplated that the depth d of these truncated cones may be substantially identical with respect to each other and may be at least greater than or equal to the height of the LEDs 202 being tested. This configuration allows the integrating sphere 206, along with the first portion 210A, to move freely with respect to the substrate 204 and to engage with any given second portion 210B, which jointly forms a light collector 210 with the first portion 210A to facilitate light collection as previously described.

It is to be understood that a light collector in accordance with the present disclosure may be configured in various other manners without departing from the spirit and scope of the present disclosure. It is also to be understood that the light collector in accordance with the present disclosure is not limited to the size of only a single LED. That is, the size of the integrating sphere 206 and the light collector 210 may be configured so that light emitted by several or many LEDs can be collected simultaneously by the integrating sphere 206 for measurements without departing from the spirit and scope of the present disclosure.

To reiterate, the testing systems configured in accordance with embodiments of the present disclosure allow collection of essentially all light from one or more particular LEDs under test for accurate measurement of flux and color. Such testing systems may be particularly useful for performing testing wherein the integrating sphere alone may not be sufficient to collect all light due to the presence of adjacent LEDs or other obstacles.

It is to be understood that while the examples above referenced light-emitting diodes (LEDs) as devices under test, references to such LEDs are merely exemplary. It is contemplated that testing systems configured in accordance with embodiments of the present disclosure may be utilized for testing various other types of light-emitting devices without departing from the spirit and scope of the present disclosure.

It is also to be understood that the optical component generally referred to as the "integrating sphere" does not limit its internal cavity to be perfectly spherical. It is contemplated that the cavity may be configured to be other forms such as a hemisphere or the like, as long as the cavity is designed to substantially collect and homogenize the light from the light source being tested.

It is further contemplated that the testing systems in accordance with embodiments of the present disclosure are not only suitable for testing of partially packaged LEDs positioned on a substrate, but also suitable for testing of fully packaged LEDs without departing from the spirit and scope of the present disclosure. For instance, upon completion of final packaging, LEDs may be held individually in a fixture (clamp or other mechanisms) on a rotating turret or a movable belt assembly.

Figure 7:
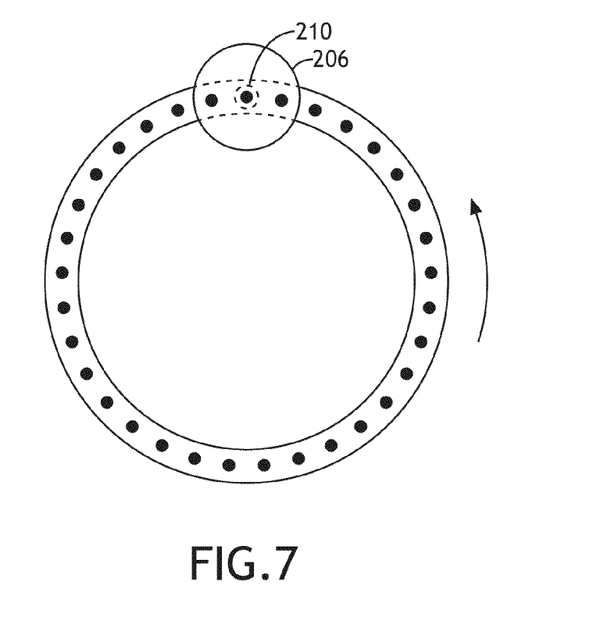
FIG. 7 is an illustration depicting a top view of a testing system utilizing a rotating turret as the support structure for a plurality of LEDs.
Figure 8:
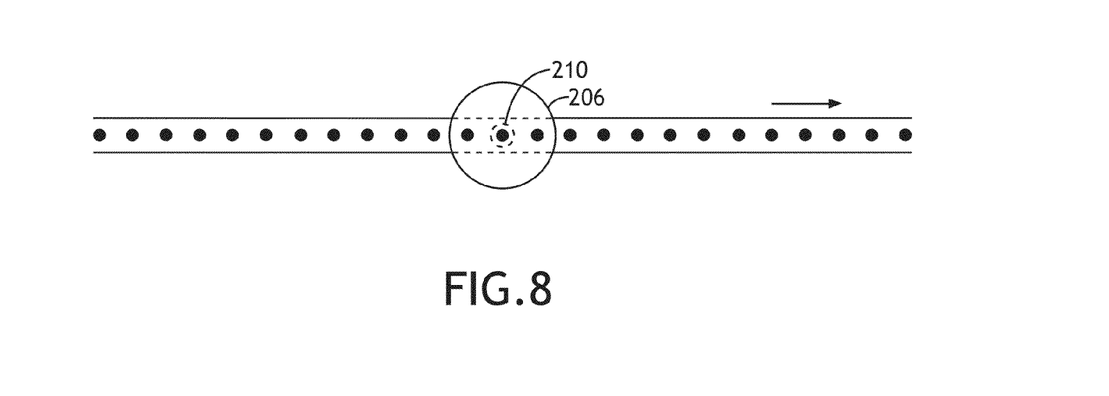
FIG. 8 is an illustration depicting a top view of a testing system utilizing a movable belt as the support structure for a plurality of LEDs.

FIGS. 7 and 8 are illustrations depicting top views of a simplified rotating turret and a simplified movable belt assembly. Similar to the testing systems previously described, a light collection device 210 located on the bottom of an integrating sphere 206 may be configured to move separately from the integrating sphere 206, allowing the collection device 210 to quickly move down to collect all the light of the device under tested, and then move up to allow the next device to be positioned for testing. Alternatively, the light collection device 210 may be split into two parts: one part being fixed to the integrating sphere while another part being fixed to the fixture used for holding the device under test. As previously described, either configuration enables the light collection device 210 to facilitate collection of substantially all the light emitted by the device under test, hence minimizing light losses and improving measurement accuracies.

Figure 9:
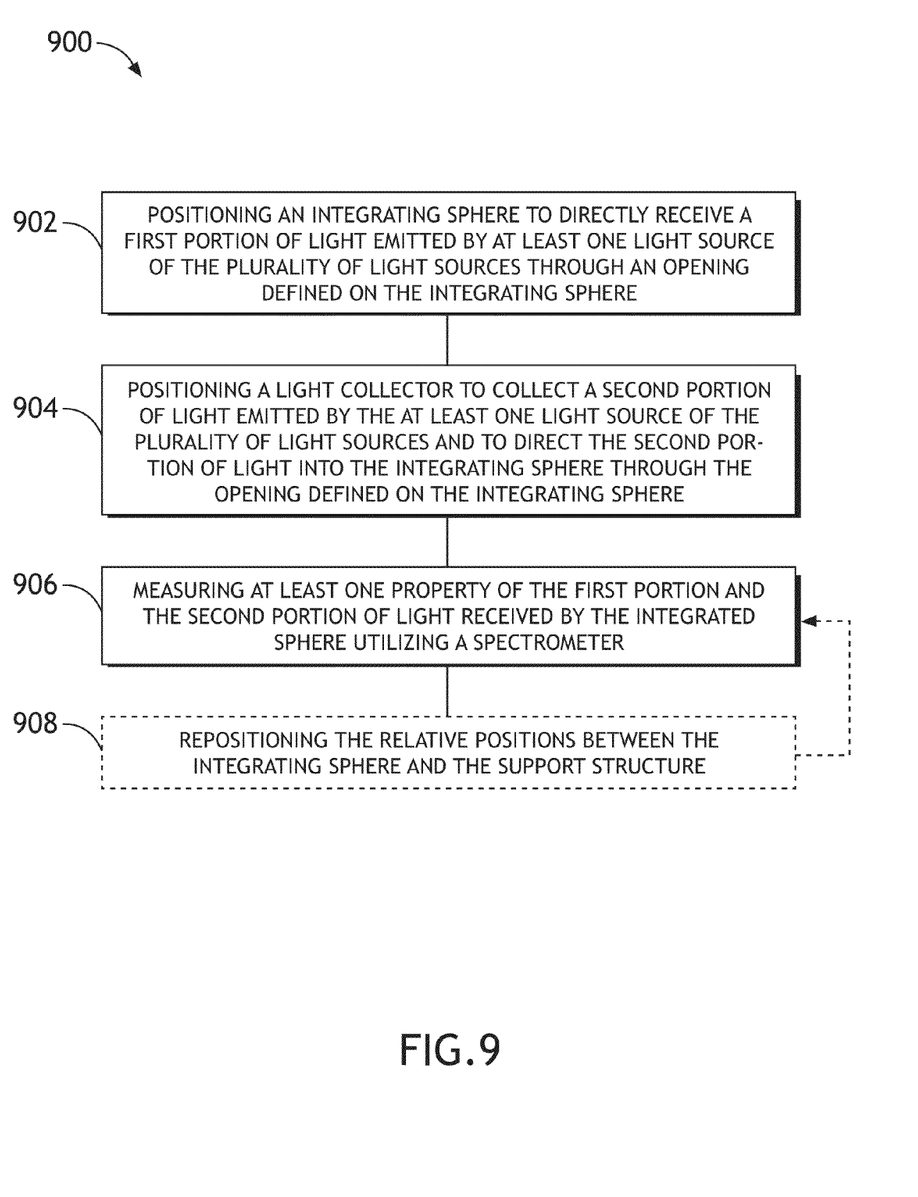
FIG. 9 is a flow diagram depicting a method for in-line testing of a plurality of light sources positioned on a support structure.

Referring now to FIG. 9, a flow diagram depicting a method 900 for in-line testing of a plurality of light sources positioned on a support structure is shown. The support structure may include a ceramic or tile substrate, a rotating turret, a movable belt, or various other types of mechanical positioning fixtures. In a step 902, an integrating sphere is positioned to directly receive a first portion of light emitted by at least one light source under test through an opening defined on the integrating sphere. In a step 904, a light collector is positioned to collect a second portion of light emitted by the light source under test and to direct the second portion of light into the integrating sphere through the opening defined on the integrating sphere. In a step 906, one or more properties (e.g., flux, spectrum and the like) of the first portion and the second portion of light collectively received by the integrating sphere are measured. Subsequently, the integrating sphere and the light collector may be utilized to measure properties of other light sources in similar manners in a step 908.

The methods disclosed may be implemented in various testing tools as sets of instructions executed by one or more processors, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. An apparatus, comprising:
    an integrating sphere for directly receiving a first portion of light emitted by a light source through an opening defined on the integrating sphere;
    a light collector for collecting a second portion of light emitted by the light source and directing the second portion of light into the integrating sphere through the opening defined on the integrating sphere, the light collector being retractable with respect to the integrating sphere; and
    a spectrometer for measuring at least one property of the first portion and the second portion of light received by the integrating sphere.

2. The apparatus of claim 1, wherein the light collector includes a specular reflecting inner surface.

3. The apparatus of claim 2, wherein the light collector is a truncated conical light collector with two openings defined on two opposite ends of the truncated conical light collector, wherein a first opening defined on a first end of the truncated conical light collector generally coincides with the opening defined on the integrating sphere, and wherein a second opening defined on a second end of the truncated conical light collector extends toward the light source.

4. The apparatus of claim 3, wherein the light source is positioned on a support structure, and wherein the second opening defined on the second end of the truncated conical light collector extends toward the support structureand substantially surrounds the light source.

5. The apparatus of claim 4, wherein a cone angle of the truncated conical light collector is optimized to direct the second portion of light into the integrating sphere utilizing a single reflection.

6. The apparatus of claim 1, wherein the light source is positioned on a support structure, and wherein the light collector is a two-part collector with a first part attached to the integrating sphere and a second part fixedly attached relative to the light source.

7. A system for in-line testing of a plurality of light sources positioned on a support structure, the system comprising:
    an integrating sphere for directly receiving a first portion of light emitted by at least one light source of the plurality of light sources through an opening defined on the integrating sphere;
    a first light collector portion attached to the integrating sphere;
    a plurality of second light collector portions positioned according to positions of the plurality of light sources, wherein the first light collector portion and one of the plurality of second light collector portions jointly form a light collector for collecting a second portion of light emitted by the at least one light source of the plurality of light sources and directing the second portion of light into the integrating sphere through the opening defined on the integrating sphere; and
    a spectrometer for measuring at least one property of the first portion and the second portion of light received by the integrating sphere.

8. The system of claim 7, wherein the light collector includes a specular reflecting inner surface.

9. The system of claim 8, wherein the light collector is a truncated conical light collector with two openings defined on two opposite ends of the truncated conical light collector, wherein a first opening defined on a first end of the truncated conical light collector generally coincides with the opening defined on the integrating sphere, and wherein a second opening defined on a second end of the truncated conical light collector extends toward the at least one light source and substantially surrounds the at least one light source.

10. The system of claim 9, wherein a cone angle of the truncated conical light collector is optimized to direct the second portion of light into the integrating sphere utilizing a single reflection.

11. The system of claim 7, wherein the first light collector portion is retractable with respect to the integrating sphere.

12. The system of claim 7, wherein the first light collector portion is fixedly attached to the integrating sphere.

13. A method for in-line testing of a plurality of light sources positioned on a support structure, the method comprising:
    positioning an integrating sphere to directly receive a first portion of light emitted by at least one light source of the plurality of light sources through an opening defined on the integrating sphere;
    extending a retractable light collector with respect to the integrating sphere toward the at least one light source of the plurality of light sources to collect a second portion of light emitted by the at least one light source of the plurality of light sources and to direct the second portion of light into the integrating sphere through the opening defined on the integrating sphere; and
    measuring at least one property of the first portion and the second portion of light received by the integrating sphere utilizing a spectrometer.

14. The method of claim 13, wherein the light collector is a truncated conical light collector with two openings defined on two opposite ends of the truncated conical light collector, and wherein the step of extending the light collector includes:
    positioning a first opening defined on a first end of the truncated conical light collector to generally coincide with the opening defined on the integrating sphere; and
    positioning a second opening defined on a second end of the truncated conical light collector to extend toward the at least one light source and to substantially surround the at least one light source.

15. The method of claim 14, further comprising:
    optimizing a cone angle of the truncated conical light collector to direct the second portion of light into the integrating sphere utilizing a single reflection.

16. The method of claim 14, further comprising:
    repositioning a relative position between the integrating sphere and the support structure, allowing the integrating sphere to directly receive a first portion of light emitted by at least one other light source of the plurality of light sources through the opening defined on the integrating sphere;
    repositioning the light collector to collect a second portion of light emitted by the at least one other light source of the plurality of light sources and to direct the second portion of light into the integrating sphere through the opening defined on the integrating sphere; and
    measuring at least one property of the first portion and the second portion of light received by the integrating sphere utilizing the spectrometer.

17. The method of claim 16, further comprising:
    retracting the light collector prior to repositioning the relative position between the integrating sphere and the support structure; and
    extending the light collector after repositioning the relative position between the integrating sphere and the support structure.

* * * * *